US006109656A

United States Patent [19]

Waldron

[11] Patent Number: 6,109,656

[45] Date of Patent: Aug. 29, 2000

[54] NOTEPAD AND NOTES ADAPTED TO BE ADHESIVELY SECURED TO AN OBJECT

[76] Inventor: Brian Waldron, 13 Hemlock Ave., Newton, N.J. 07860

[21] Appl. No.: 09/157,302

[22] Filed: Sep. 18, 1998

[51] Int. Cl.[7] .............................. B32B 7/14; B42D 19/00

[52] U.S. Cl. ....................... 281/2; 281/5; 281/2; 281/12; 428/40; 283/61; 283/62

[58] Field of Search ............................ 281/2, 5, 3.1, 4.1, 281/10, 12, 13, 14; 428/40; 283/56, 61, 62, 63.1; 53/416

[56] References Cited

U.S. PATENT DOCUMENTS

| | | | |
|---|---|---|---|
| H377 | 12/1987 | Greig | 281/2 |
| 237,223 | 2/1881 | Wright . | |
| 249,071 | 11/1881 | Meade . | |
| 1,434,097 | 10/1922 | Connor . | |
| 2,131,448 | 9/1938 | Lowen . | |
| 2,213,666 | 9/1940 | Burke | 40/2 |
| 2,260,601 | 10/1941 | Brenn | 270/52 |
| 3,131,951 | 5/1964 | Ohlsson | 282/22 |
| 4,112,603 | 9/1978 | Giulie | 40/2 R |
| 4,243,458 | 1/1981 | Giulie | 156/247 |
| 4,590,109 | 5/1986 | Holmberg | 428/40 |
| 4,637,633 | 1/1987 | Instance | 283/81 |
| 4,738,391 | 4/1988 | Wiseman | 229/80 |
| 4,889,234 | 12/1989 | Sorensen et al. | 206/459 |
| 4,950,517 | 8/1990 | Loggins | 428/40 |
| 5,011,186 | 4/1991 | Bodziak et al. | 281/12 |
| 5,286,546 | 2/1994 | Su | 428/194 |
| 5,318,825 | 6/1994 | Naber | 428/192 |
| 5,342,665 | 8/1994 | Krawitz | 428/40 |
| 5,350,612 | 9/1994 | Stern et al. | 428/40 |
| 5,390,819 | 2/1995 | Kaye | 221/45 |
| 5,606,846 | 3/1997 | Raby et al. | 53/415 |
| 5,641,550 | 6/1997 | Berman et al. | 428/40.9 |
| 5,778,578 | 7/1998 | Drapcho et al. | 40/491 |
| 5,887,899 | 3/1999 | Dobbins | 281/2 |
| 5,901,982 | 5/1999 | Cooper | 281/31 |

*Primary Examiner*—Willmon Fridie, Jr.
*Assistant Examiner*—Alisa Thurston
*Attorney, Agent, or Firm*—Thomas L. Adams, Esq.

[57] ABSTRACT

A notepad has a plurality of stacked notes adapted to be secured to an object. The notes each have a leaf with an edge. Each note also has an adhesive sheet secured along the edge of the leaf. This adhesive sheet has (a) an overlay section overlaying part of the leaf, and (b) a narrowed extension section extending away from the leaf in an extension direction. This extension section is adapted to be secured to the object.

18 Claims, 2 Drawing Sheets

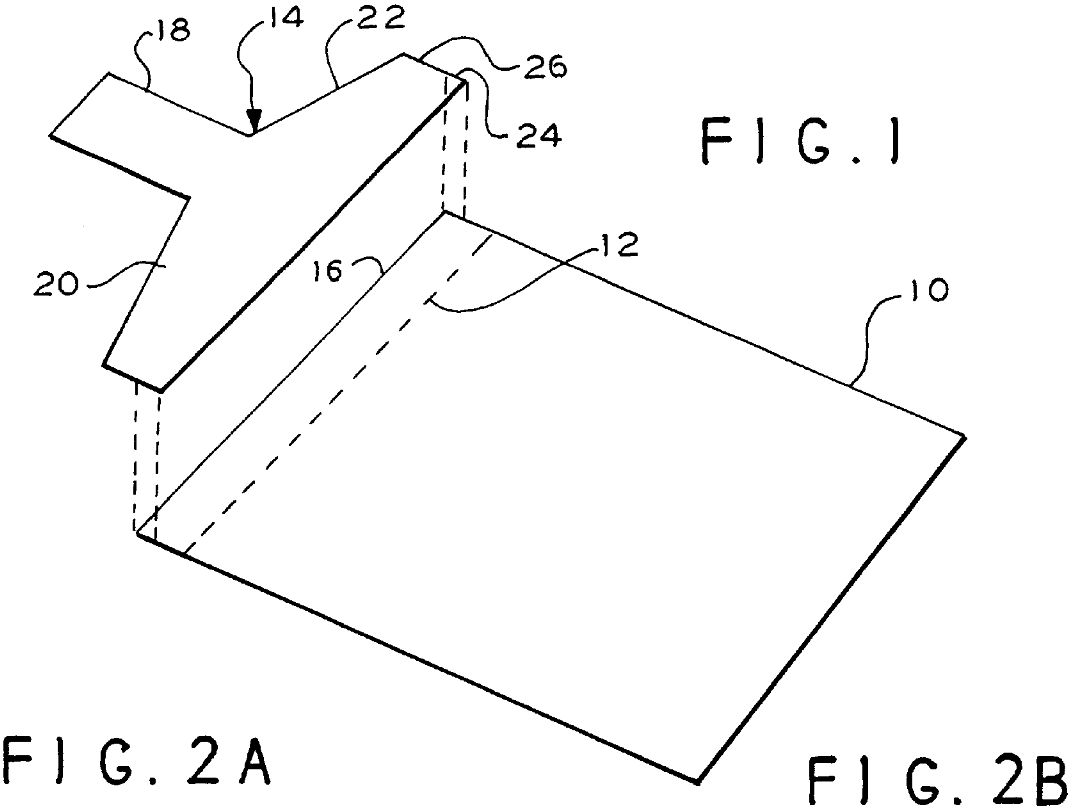
FIG. 1
FIG. 2A
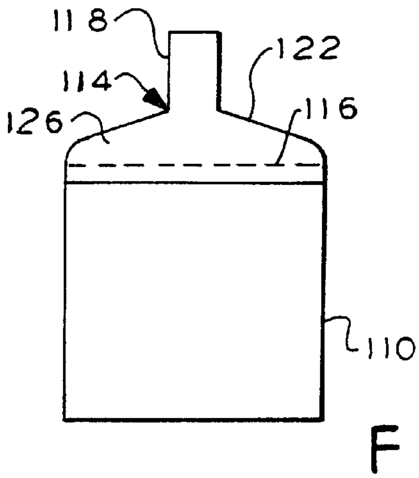
FIG. 2B
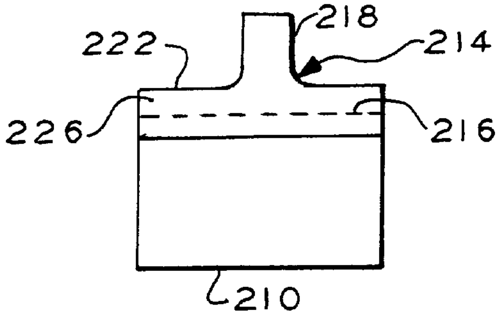
FIG. 2C
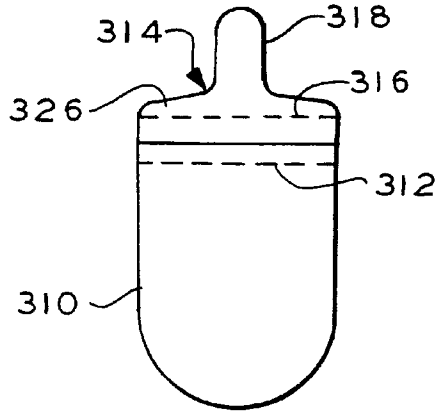
FIG. 2D
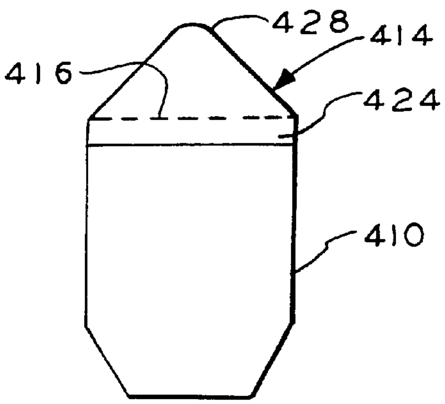

NOTEPAD AND NOTES ADAPTED TO BE ADHESIVELY SECURED TO AN OBJECT

BACKGROUND OF THE INVENTION

1. Field of the Invention

The present invention relates to notes and notepads, and particularly, to adhesive features thereof.

2. Description of Related Art

Removable notes and notepads are known in the prior art. A removable, pressure-sensitive adhesive is used in such a notepad and is commercially marketed under the trademark "POST-IT" by the Minnesota Mining and Manufacturing Co. ("3M"), St. Paul Minn., U.S.A. While these notepads work satisfactorily in the light duty environment of the typical office, they do not perform satisfactorily and other environments.

Notepads of this type have been proposed having a variety of outlines and with adhesive sections arranged in a variety of shapes and positions. See U.S. Pat. Nos. 5,011,186; 5,286,546; 5,318,825; and 5,390,819; and U.S. Statutory Invention Registration H377. See also U.S. Pat. No. 5,641, 550, which shows a notepad where the bottom sheet uses a stronger adhesive to secure the pad to a surface.

U.S. Pat. No. 4,950,517 shows a strip holding a number of stickers having adhesive on both sides.

A disadvantage with the notes and stickers of the foregoing type is their inability to withstand a heavy duty environment. For example, at a construction site workers may wish to place notes on studs, pipes, wall boards, and other objects to indicate where a variety of utilities, holes and fixtures and the like ought to be located. At a construction site there will be much activity and movement of heavy material and equipment that can easily dislodge a note. Furthermore, some sites may be outdoors or exposed to the elements and must therefore withstand winds, precipitation etc. Secure temporary notes may therefore be needed under such conditions, but not as secure and difficult to remove as a permanent tag.

U.S. Pat. No. 4,112,603 shows a luggage tag formed of two sheets that can be laminated together over an address label. After laminating, the two tongues on the tag can be formed into a loop and secured together with an adhesive. This tag, however, is not a simple device that can be readily adhered to an object, removed and discarded.

See also U.S. Pat. Nos. 2,260,601; 3,131,951; 5,342,665; and 5,350,612.

Accordingly, there it is a need for a an improved note and notepad that avoids the disadvantages of the prior art.

SUMMARY OF THE INVENTION

In accordance with the illustrative embodiments demonstrating features and advantages of the present invention, there is provided a note adapted to be secured to an object. The note has a leaf with an edge. The note also has an adhesive sheet secured along the edge of the leaf. This adhesive sheet has (a) an overlay section overlaying part of the leaf, and (b) a narrowed extension section extending away from the leaf in an extension direction. The extension section is adapted to be secured to the object.

In accordance with another aspect of the present invention, a notepad is provided with a plurality of stacked notes adapted to be secured to an object. Each of the notes has a leaf with an edge. Each of the notes also has an adhesive sheet, secured along the edge of the leaf. This adhesive sheet has (a) an overlay section overlaying part of the leaf, and (b) a narrowed extension section extending away from the leaf in an extension direction. The extension section is adapted to be secured to the object.

By employing devices of the foregoing type, improved notes and notepads can be achieved. In a preferred embodiment, a rectangular sheet of paper has one of its edges overlaid with a T-shaped adhesive sheet. The portion of the adhesive sheet overlying the paper's edge reinforces this edge to prevent tearing. This T-shaped sheet has a strip extending outwardly to attach to an object. This strip provides an easily manipulated attachment means.

Also, this preferred strip can allow the paper to lift from the supporting object under various conditions, including wind load. Thus branches of the adhesive sheet at the paper's edge may become loose while the outwardly extending strip still remains attached. This strip can twist and allow the paper to twist in the wind, if necessary.

Also in this preferred embodiment, the paper can have a perforation to allow removal of the paper from the adhesive sheet.

Preferably, the notes with adhesive sheets can be stacked into a notepad. Individual notes can be removed by grasping the paper and lifting it to peel the adhesive sheet from its underlying neighbor.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is an exploded, axonometric view of a note in accordance with principles of the present invention;

FIGS. 2A through 2D are front views of four embodiments of notes that are alternates to that of FIG. 1;

DETAILED DESCRIPTION OF THE PREFERRED EMBODIMENTS

Figure 3:
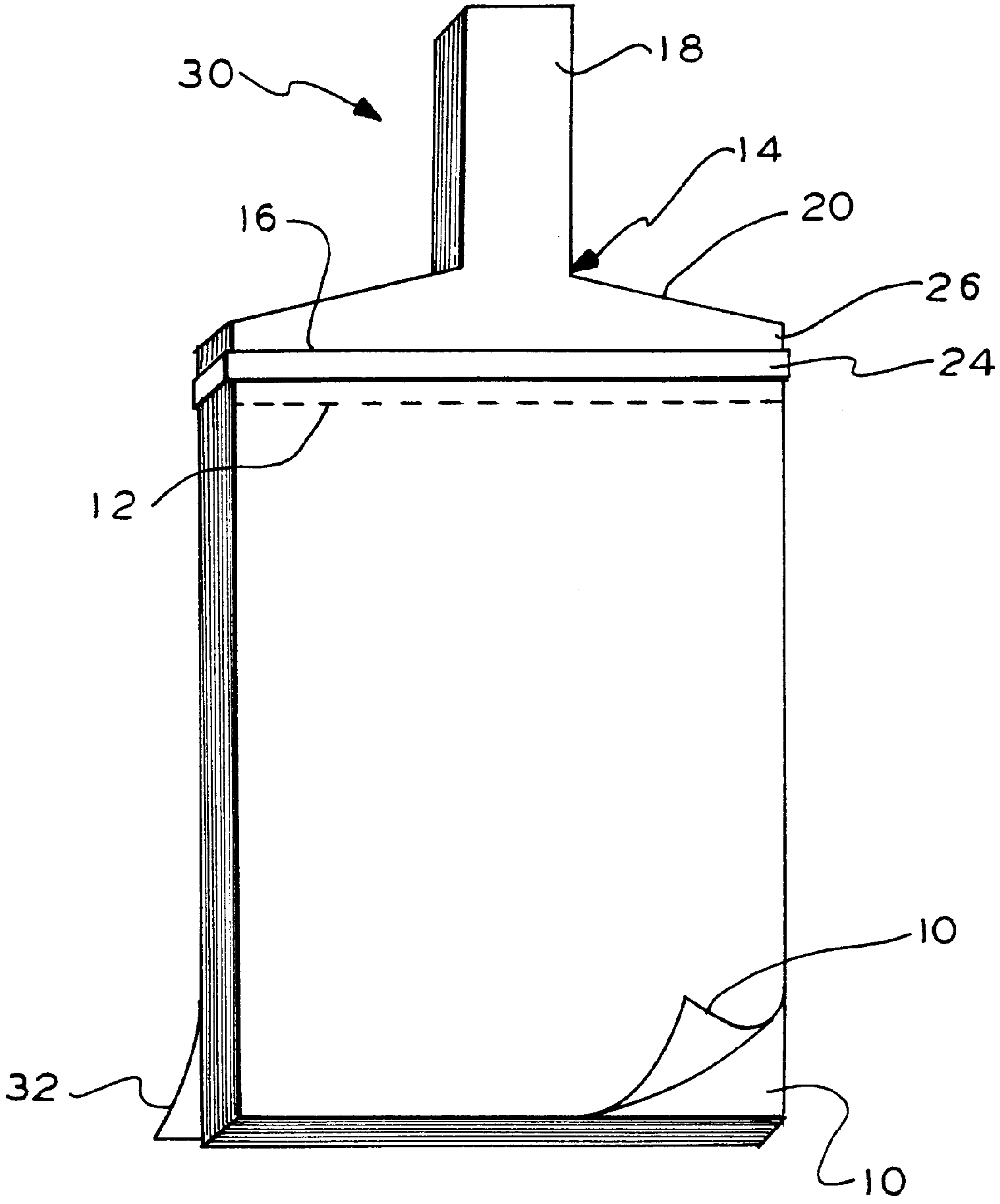
FIG. 3 is an axonometric view of a notepad in accordance with the principles of the present invention, using the note of FIG. 1.

Referring to FIG. 1, a note a shown with a leaf 10 in the form of a sheet of paper with a rectangular (or more generally a polygonal) outline. Various types of paper of different grades and weights can be employed. In some embodiments the paper will be replaced with a sheet made of plastic or other materials. Leaf 10 is shown with a weakened line, namely a series of perforations 12.

An adhesive sheet 14 is shown as a T-shaped plastic film coated with an adhesive on the side facing leaf 10. Sheet 14 is designed to overlay the edge 16 of leaf 10. This permits specialization for the two separate components. The adhesive sheet 14 can be strong and flexible while paper leaf 10 can provide a superior writing surface that is less expensive than the material used in the adhesive sheet 14. Other material combinations with other differentiated advantages are also possible. The distal portion 18 of sheet 14 has parallel borders and merges with a broad segment 20. Distal portion 18 extends outwardly in what is referred to as the extension direction. Sheet 14 may be made from the plastic films that are typically used for adhesive tape, although other materials of various sizes and thicknesses may be used instead.

As indicated by the dotted lines, only a portion of segment 20 overlays the edge 16 of leaf 10, and this portion is referred to as overlay section 24. The rest of the adhesive sheet 14, including the distal portion 18 is referred to as a narrowed extension section. This narrowed extension section has tapered shoulders 22 merging with the parallel borders of distal portion 18. The portion of this narrowed extension section between distal portion 18 and overlay section 24 is referred to as proximal portion 26. Thus, this narrowed extension section 18, 26 has a distal portion 18 and a proximal portion 26.

Referring to FIG. 2A, an alternate embodiment is illustrated in which components corresponding to elements of FIG. 1 have been increased by 100. Adhesive sheet 114 has a strip-like distal portion 118, similar to that previously described. The proximal portion 126 of this narrowed extension section (118, 126) is similar to that previously described, except that the shoulders 122 are more rounded. Unlike the previous embodiment, leaf 110 does not have a line of perforations.

Referring to FIG. 2B, another alternate embodiment is illustrated in which components corresponding to elements of FIG. 1 have been increased by 200. Adhesive sheet 214 has a strip-like distal portion 118, similar to that previously described, although slightly shorter. The proximal portion 226 of this narrowed extension section (218, 226) is similar to that previously described, except that the shoulders 222 are not tapered and are straight, except for a rounded transition at the junction with distal portion 218. Leaf 210 is rectangular, but is in this embodiment, significantly shorter.

Referring to FIG. 2C, still another alternate embodiment is illustrated in which components corresponding to elements of FIG. 1 have been increased by 300. Adhesive sheet 314 has a strip-like distal portion 118, similar to that previously described, except that its tip is rounded. The proximal portion 326 of this narrowed extension section (318, 326) is similar to that previously described in connection with FIG. 2A. Leaf 310 has a rectangular upper section joined with a semi-cylindrical lower section. In this embodiment, leaf 310 as a perforation line 312.

Referring to FIG. 2D, yet another alternate embodiment is illustrated in which components corresponding to elements of FIG. 1 have been increased by 400. Adhesive sheet 414 is somewhat triangular with vertices that are less sharp and more complex than a true triangle. Accordingly, sheet 414 does not have a distinct securing strip as with the other embodiments. Sheet 414 does have a narrowed extension section 428, and beyond leaf edge 416 an overlay section 424. Leaf 410 has an outline that is a six-sided polygon. Essentially, leaf 410 is a rectangle with two bevelled corners.

Referring to FIG. 3, a notepad 30 is shown as a stack of notes, each formed in the manner described in FIG. 1. Corresponding components and features have the same reference numerals. Notepad 30 can include any convenient number of notes. Each note comprises a leaf 10 overlaid along its edge 16 by the overlay section 24 of adhesive sheet 14. Therefore, there will be no adhesion between the leaves 10 themselves, since their undersides are free of the adhesive sheet 14. There will be adherence, however, at the distal portion 18 and the proximal portion 26 of the narrowed extension section of the adhesive sheet 14, which will bind the notes together as a notepad.

A backer 32 underlies notepad 30, and is preferably a stiffer, more durable material than that of leaf 10. For example, backer 32 may be a relatively thick cardboard, a plastic sheet, or other suitable material. Backer 32 has an outline that matches the combined outline of leaf 10 and adhesive sheet 14. In the simplest embodiment, the backer 32 may adhered to the notepad 30 by simply adhering to the last one of the adhesive sheets 14. In other embodiments, backer 32 may use a special adhesive to bind to notepad 30.

To facilitate an understanding of the principles associated with the foregoing apparatus, its operation will be briefly described. Operation will be described in connection with the notes and notepad of FIGS. 1 and 3, although the operation with the other embodiments will be similar.

Notes will normally be supplied in a notepad 30 as shown in FIG. 3. A user may write a note on the top one of the leaves 10, or may wait until later when the note is secured in place. In any event, a user may peel away the top note by typically grasping a corner of leaf 10 and lifting until leaf 10 pulls adhesive sheet 14 off the stack. The user will normally pull gradually to avoid bursting the perforations 12. The top adhesive sheet 14 can be peeled away by first dislodging one of the corners of the broad segment 20, eventually lifting all of this segment, as well as the distal portion 18.

The user may now bring the note to an object that needs to be marked. For example, at a construction site, a worker may wish to secure a note to either a stud, pipe, wall board, or other object to indicate where various utilities are to be routed (although other types of environments are contemplated). The user may secure the note to an object by pressing the distal portion 18 and proximal portion 26 of the adhesive sheet 14 to the object.

In some environments, the leaf 10 may be subjected to various forces such as wind or the occasional brushing by a worker. Adhesive sheet 14 is less likely to be accidentally dislodged because it has a narrowed section (distal portion 18 and proximal portion 26). The narrowing that occurs between portions 26 and 18 permits some yielding of the adhesive without a full release. At the broadest portion of the narrowed section, namely portion 26, the adhesive sheet 14 tends to hold the entire edge 16 of leaf 10 in place. This may allow the leaf 10 to lift somewhat at its three other edges, but not along its top edge 16.

If a disturbing force is applied to leaf 10, the broad segment 20 may become dislodged. Under those circumstances, the top edge 16 of leaf 10 is now free to lift from the object. Since distal portion 18 is relatively narrow and will tend to stay adhered longer, adhesive sheet 14 has the ability to twist in the vicinity between the junction of distal portion 18 and proximal portion 26. Thus, leaf 10 can twist as well and will be less likely to fall from the object.

When the note is no longer needed, leaf 10 may be removed by tearing it away along perforation 12. This removal method is exceptionally fast and convenient for those environments where leaving the adhesive sheet 14 behind does not constitute a problem.

While the above embodiments have a single narrowed extension section on the adhesive sheet, other embodiments may have multiple narrowed extension sections. For example, an alternate embodiment may have a $\pi$-shaped adhesive sheet which provides two narrowed extension sections. Other embodiments may have three or more narrowed extension sections, however.

Obviously, many modifications and variations of the present invention are possible in light of the above teachings. It is therefore to be understood that within the scope of the appended claims, the invention may be practiced otherwise than as specifically described.

What is claimed is:

1. A note adapted to be secured to an object, comprising:

a leaf having an edge: and a T-shaped adhesive sheet made of a material different from that of said leaf, and secured along the edge of said leaf, said adhesive sheet having (a) an overlay section overlaying part of said leaf, and (b) a narrowed extension section extending away from said leaf in an extension direction, said extension section having adhesive and being adapted to be secured to said object, said extension section being shaped to allow twisting thereof.

2. A note according to claim 1 wherein said extension section of said adhesive sheet is narrower than said leaf.

3. A note according to claim 2 wherein said leaf has a weakened line spaced from said adhesive sheet for facilitating parting of said leaf along said line.

4. A note according to claim 3 wherein said weakened line comprises a series of perforations.

5. A note according to claim 2 wherein said extension section is shaped to allow twisting thereof.

6. A note according to claim 1 wherein said extension section comprises:

a proximal portion contiguous with and about the same width as said overlay section of said adhesive sheet, said proximal portion being spaced from said adhesive sheet; and a distal portion narrower than said proximal portion and extending in said extension direction.

7. A note according to claim 6 wherein said distal portion of said extension section of said adhesive sheet has a pair of parallel borders extending in said extension direction.

8. A note according to claim 1 wherein said leaf comprises paper.

9. A note according to claim 1 wherein said leaf comprises a surface adapted for writing.

10. A notepad having a plurality of stacked notes adapted to be secured to an object, each of said notes comprising:

a leaf having an edge; and a T-shaped adhesive sheet made of a material different from that of said leaf, and secured along the edge of said leaf, said adhesive sheet having (a) an overlay section overlaying part of said leaf, and (b) a narrowed extension section extending away from said leaf in an extension direction, said extension section having adhesive and being adapted to be secured to said object, said extension section being shaped to allow twisting thereof.

11. A notepad according to claim 10 wherein said extension section of each of the notes are releasably adhered to one another, so that said notes can be individually removed from the pad and used.

12. A notepad according to claim 11 comprising:

a backer attached to a terminal one of said notes.

13. A notepad according to claim 10 wherein said extension section of said adhesive sheet is narrower than said leaf.

14. A notepad according to claim 13 wherein said leaf has a weakened line spaced from said adhesive sheet for facilitating parting of said leaf along said line.

15. A notepad according to claim 14 wherein said weakened line comprises a series of perforations.

16. A notepad according to claim 13 wherein said extension section is shaped to allow twisting thereof.

17. A notepad according to claim 10 wherein said extension section comprises:

a proximal portion contiguous with and about the same width as said overlay section of said adhesive sheet, said proximal portion being spaced from said adhesive sheet; and a distal portion narrower than said proximal portion and extending in said extension direction.

18. A notepad according to claim 17 wherein said distal portion of said extension section of said adhesive sheet has a pair of parallel borders extending in said extension direction.

* * * * *